United States Patent
Bilgram et al.

(10) Patent No.: US 7,018,577 B2
(45) Date of Patent: Mar. 28, 2006

(54) PANEL LINER AND METHOD OF MAKING SAME

(75) Inventors: Walter R. Bilgram, Chesterfield, MO (US); Lynn E. Osborn, Wildwood, MO (US); James D. Caldwell, Jr., Greenville, NC (US)

(73) Assignee: INA Acquisition Corporation, Wilmington, DE (US)

( * ) Notice: Subject to any disclaimer, the term of this patent is extended or adjusted under 35 U.S.C. 154(b) by 0 days.

(21) Appl. No.: 10/364,096

(22) Filed: Feb. 11, 2003

(65) Prior Publication Data

US 2004/0157022 A1 Aug. 12, 2004

(51) Int. Cl.
*B29C 70/42* (2006.01)
*B29C 70/28* (2006.01)
*B29C 73/04* (2006.01)
*B29C 73/10* (2006.01)
*B28B 21/04* (2006.01)

(52) U.S. Cl. .................. 264/135; 264/36.16; 264/40.4; 264/136; 264/137; 264/256; 264/257; 264/333; 285/15; 285/55

(58) Field of Classification Search ............ 264/36.16, 264/135, 136, 137, 256, 257
See application file for complete search history.

(56) References Cited

U.S. PATENT DOCUMENTS

| | | | | |
|---|---|---|---|---|
| 2,815,534 A | * | 12/1957 | Ising et al. ................ 264/257 |
| 2,977,268 A | * | 3/1961 | Randolph ................... 264/257 |
| 3,532,132 A | * | 10/1970 | Rubenstein ................. 138/172 |
| 3,662,045 A | * | 5/1972 | Tierling ........................ 264/35 |
| 4,009,063 A | | 2/1977 | Wood |
| 4,064,211 A | | 12/1977 | Wood |
| 4,260,445 A | * | 4/1981 | Mayumi et al. ............ 156/276 |
| 4,400,019 A | * | 8/1983 | Fruck ........................... 285/55 |
| 4,513,040 A | * | 4/1985 | Lankard ....................... 428/49 |

(Continued)

FOREIGN PATENT DOCUMENTS

JP    2003-81661 A  *  3/2003

(Continued)

OTHER PUBLICATIONS

English Machine Translation of JP 2003-81681 A, Japanese Patent Office website, Jul. 2005.*

*Primary Examiner*—Michael P. Colaianni
*Assistant Examiner*—Michael I. Poe
(74) *Attorney, Agent, or Firm*—Husch & Eppenberger LLC; Gregory E. Upchurch

(57) ABSTRACT

A method of forming a liner for a passage such as a sewer includes forming panels composing the liner using a neat resin of a first density and a polymer concrete of a second, higher density. The neat resin is inserted into a mold cavity before the polymer concrete and is displaced upwardly by the polymer concrete pour to impregnate a fiber layer disposed along the periphery of the mold cavity. Resulting panels preferably have an offset joint to increase the joint strength between upper and lower panels forming the liner.

10 Claims, 7 Drawing Sheets

U.S. PATENT DOCUMENTS

| | | | | |
|---|---|---|---|---|
| 4,752,431 A | * | 6/1988 | Knowles | 264/512 |
| 4,897,135 A | | 1/1990 | Aylor, Jr. et al. | |
| 5,186,987 A | * | 2/1993 | Imoto et al. | 428/34.5 |
| 5,209,968 A | * | 5/1993 | Sweeney | 428/312.4 |
| 5,242,637 A | * | 9/1993 | Inoue et al. | 264/45.3 |
| 5,296,187 A | * | 3/1994 | Hackman | 264/257 |
| 5,308,572 A | * | 5/1994 | Hackman | 264/510 |
| 6,354,330 B1 | | 3/2002 | Wood | |
| 6,494,978 B1 | * | 12/2002 | Bertram | 156/79 |
| 6,878,323 B1 | * | 4/2005 | Fyfe | 264/135 |
| 2004/0130067 A1 | * | 7/2004 | Skinner et al. | 264/257 |

FOREIGN PATENT DOCUMENTS

WO    WO 02/16115 A1    2/2002

* cited by examiner

PANEL LINER AND METHOD OF MAKING SAME

CROSS-REFERENCE TO RELATED APPLICATIONS

None.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

This invention relates to the lining of sewers, water mains, culverts, tunnels, conduits, pipes, and other passageways (generically referred to herein as passages), and especially but not exclusively to the lining of underground passages. Lining in this context is intended to include both original lining and relining. It is anticipated that the process will be used mainly for the relining, particularly the relining of sewers.

As sewers and other passages age, they deteriorate in many ways. Cracks appear and joints separate. Infiltration through these cracks and joints creates external voids, accelerates structural deterioration and can overload collection systems and treatment plants. Many passages can be successfully rehabilitated using what is called the soft-lining or cured in place method. This method is illustrated in U.S. Pat. Nos. 4,009,063 and 4,064,211. Most deteriorating sewers can be rehabilitated economically in this way.

Other rehabilitation projects, particularly those involving larger passages, may require a different method, one using a hard liner inside the existing passage. Inserting a hard liner in an existing passage poses several problems. Typically, there is a limited amount of space available in such passages, so manipulating the liner to place it in the passage and/or assemble it in place can be difficult. Moreover, the lining of such passages should not excessively reduce the cross-sectional area of the passage, since otherwise the flow rate through the passage will be unduly restricted.

Hard liners typically are formed from a polymer concrete, which in turn is composed of a suitable resin and approximately 70% by weight filler (such as sand). Frequently, one or more fiberglass layers are included adjacent the inner and outer surfaces of the liner. However, the manner in which fiberglass layers are used can result in problems, since the polymer concrete may not readily permeate the fiberglass, resulting in exposed fiberglass on either the inner or outer surface of the liner. This condition adversely affects the physical properties of the resulting laminate part, such as strength and modulus. It can also result in a loss of corrosion resistance, increased friction between the fluid and the liner, and reduced flow rate of the fluid through the passage.

SUMMARY OF THE INVENTION

Among the various objects and features of the present invention is the provision of an improved passage liner.

Another object is the provision of such a liner that facilitates the placement and assembly of the liner in a passage.

A third object is the provision of such a liner that does not unduly restrict the flow of fluid through the passage.

A fourth object is the provision of a method of making such a liner with improved impregnating of the fiberglass layer.

A fifth object is the provision of such a method that is relatively simple and inexpensive.

Other objects and features will be in part apparent and in part pointed out hereinafter.

In one aspect of the present invention, a method of making a panel for a passage liner of the present invention includes the steps of obtaining dimensions of a passage to be lined, selecting a panel having a shape suitable for use in the passage to be lined, and molding the panel in a mold cavity having a periphery. The molding step including the steps of disposing a fiber layer around at least a portion of the periphery, introducing a layer of neat resin in the mold cavity, and subsequently introducing a polymer concrete in the mold cavity such that the neat resin floats above the polymer concrete and impregnates said fiber layer as said polymer concrete is introduced.

In a second aspect of the present invention, the method of making a panel for a passage liner of the present invention includes the steps of providing a mold having a mold cavity selected to form a shape corresponding to a desired shape of a panel to be inserted in a passage to be lined, and disposing a fiber layer around at least a portion of the periphery of the mold cavity, said fiber layer having openings therein so as to allow the passage of at least some fluids from the interior of the mold space to the periphery of the mold cavity. After inserting the fiber layer, neat resin of a predetermined density is inserted into the mold cavity. The mold cavity has a top and a bottom so that the neat resin becomes disposed in the bottom of the mold cavity. A flowable, curable polymer concrete is inserted into the mold cavity after the neat resin is inserted, the polymer concrete having a density greater than the density of the neat resin so that the polymer concrete displaces neat resin from the bottom of the mold cavity toward the top of the mold cavity. The neat resin flows through the openings in the fiberglass layer to impregnate the fiber layer as the neat resin is displaced toward the top of the mold cavity. The neat resin and the polymer concrete are cured to form a panel of the desired shape.

In a third aspect of the present invention, a passage liner segment of the present invention includes at least first and second panels sized and shaped to jointly fit a passage to be lined. The first panel has a panel body and at least first and second prongs projecting from the panel body, the first and second prongs having substantially different lengths. The second panel has first and second mating surfaces for receiving the prongs, the first and second mating surfaces being offset circumferentially (measured in the direction along the perimeter of the liner) and radially (measured along the direction from the inside to the outside of the liner) from one another.

BRIEF DESCRIPTION OF THE DRAWINGS

Similar reference characters indicate similar parts throughout the several views of the drawings.

DESCRIPTION OF THE PREFERRED EMBODIMENT

Figure 1:
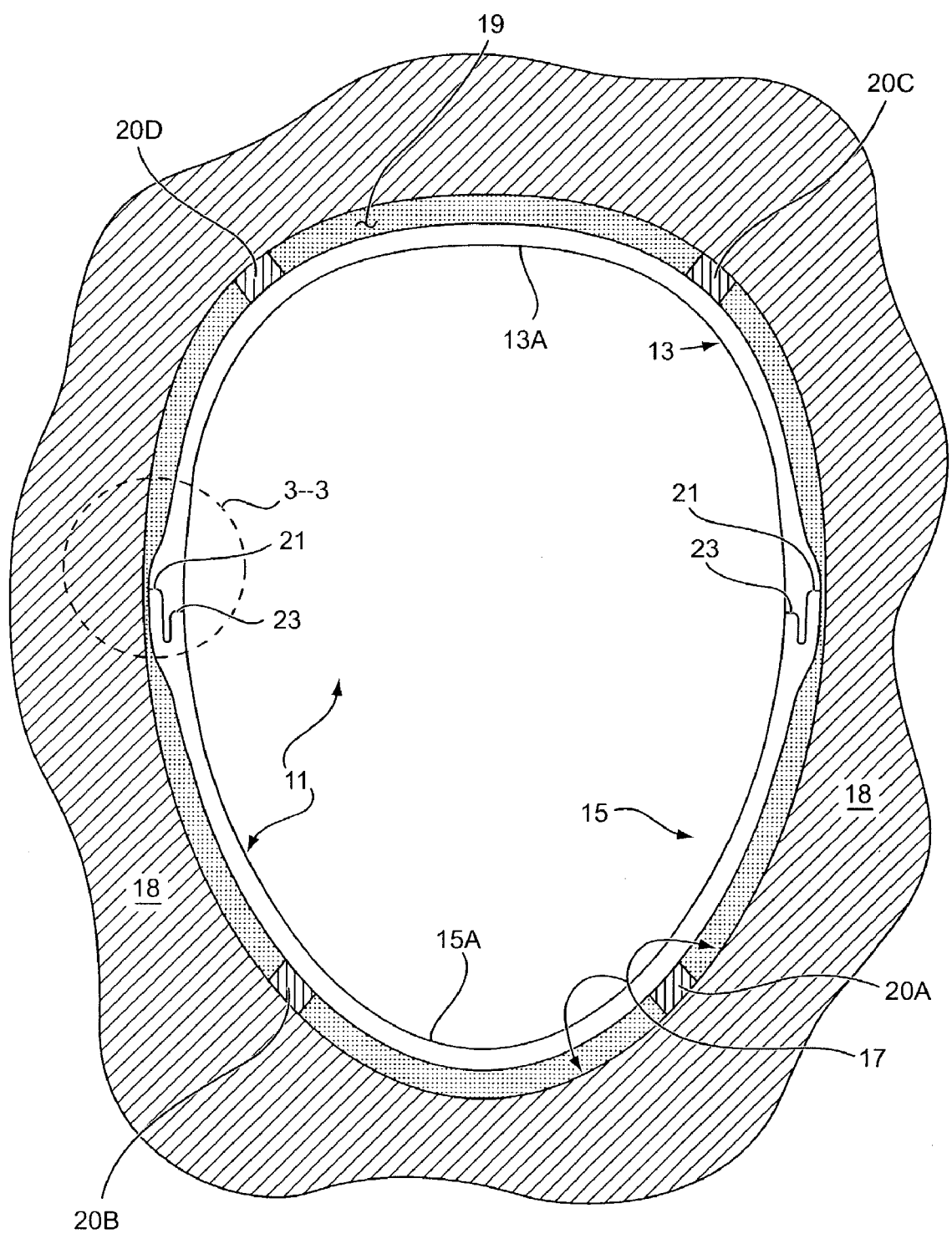
FIG. 1 is a cross-sectional view of a passage with a passage liner of the present invention.

Turning to the drawings, FIG. 1 illustrates a passage liner 11 of the present invention. Liner 11 is composed of upper and lower panels 13 and 15. (It should be appreciated that the present invention also includes liners formed from more than two panels. It could be desirable, for example, to use more than two panels to form a single segment when dealing with larger sized passages.)

Figure 2:
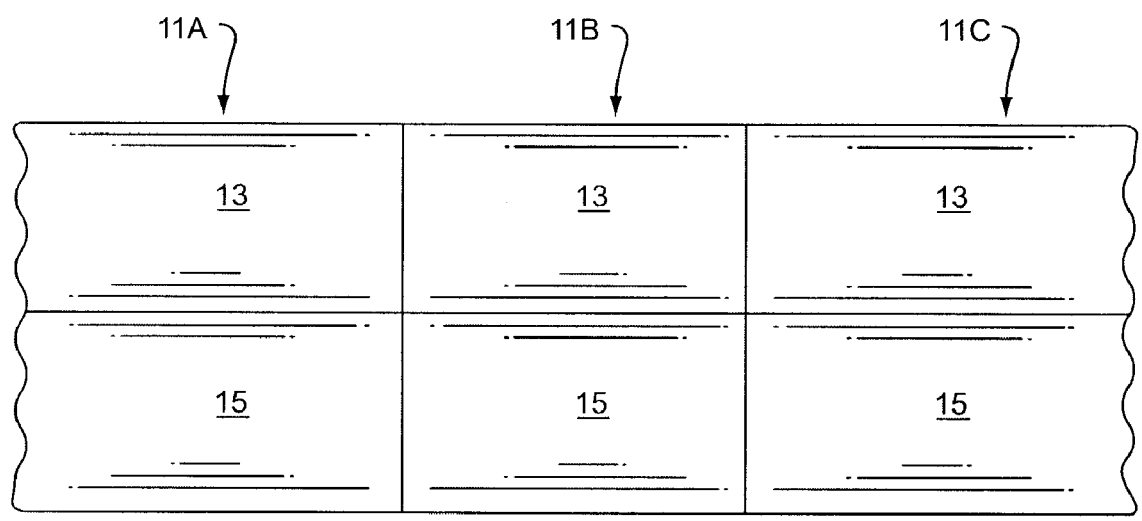
FIG. 2 is a side elevation of a portion of an assembled passage liner made in accordance with the present invention.

As can be seen more clearly in FIG. 2, liner 11 is formed in segments 11A, 11B, 11C, etc., each of which has upper and lower panels 13, 15. It should be understood that each segment is formed with suitable mating surfaces (not shown and not forming part of the present invention) so that the segments are securely and smoothly joined to each other. It is preferred (although not a requirement of the present invention) that each segment be affixed to its neighbors by a suitable water resistant adhesive, such as an epoxy or polyurethane adhesive capable of setting in the presence of water.

Liner 11 is disposed in a desired passage, such as the sewer 17 shown in FIG. 1. Sewer 17 is shown by way of illustration only. It should be understood that the present invention may be used with a passage of any type. Furthermore, the passage may be either an existing structure to be rehabilitated by liner 11, or new construction. In either event, the particular size and shape of liner 11 (and hence of panels 13, 15) is selected to fit the specific passage 17 being lined. Passage 17 is, of course, surrounded by existing solid or semi-solid material 18 such as rock, pre-existing pipe, compacted soil, or the like. After liner 11 is placed in passage 17, a suitable grout 19 is inserted between the walls of passage 17 and the exterior of liner 11. Such grouts are well-known in the industry and form no part of the present invention. It is preferred that wooden spacer blocks 20A–20D be inserted in the passage 17 to support liner 11 prior to grouting. The particular number and size of spacer blocks does not form part of the present invention. Blocks 20A and 20B are laid in the passage before panel 15 is placed. Blocks 20C and 20D are inserted along the outside of the liner after panel 13 is put into place.

Lower panel 15 has a generally U-shaped panel body 15A terminating, at the ends of each leg, in first and second prongs 21, 23. (Although the panel bodies shown are generally U-shaped, the particular shape of the panel bodies do not form a part of the present invention). Prong 21 is substantially longer than prong 23, with the result that the joint between the upper and lower panels 13, 15 is strengthened substantially against lateral forces. It is preferred that the difference in length between the two prongs be at least ¼" and preferably longer. The joint between panels 13 and 15 is best illustrated in FIG. 3.

Similarly, upper panel 13 has a generally U-shaped panel body 13A (although the particular shape of the panel body forms no part of the present invention), terminating at each end in first and second mating surfaces 25, 27 (see FIG. 3 for a depiction of the mating surfaces along the left-hand side of the liner) for receiving prongs 21, 23. Note that first and second mating surfaces 25, 27 are offset circumferentially and radially from one another. The circumferential offset is preferably at least ¼" and, like the different lengths of prongs 21, 23, results in a stronger joint between upper and lower panels 13, 15.

Figure 3:
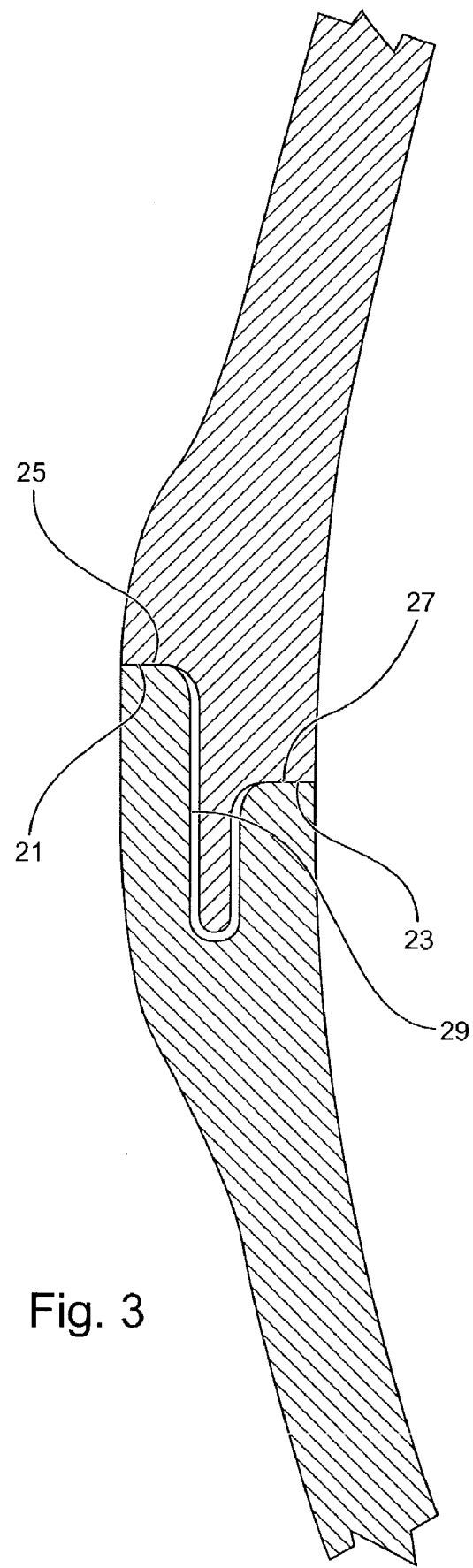
FIG. 3 is a cross-sectional view of one of the joints of the liner, as assembled.
Figure 4:
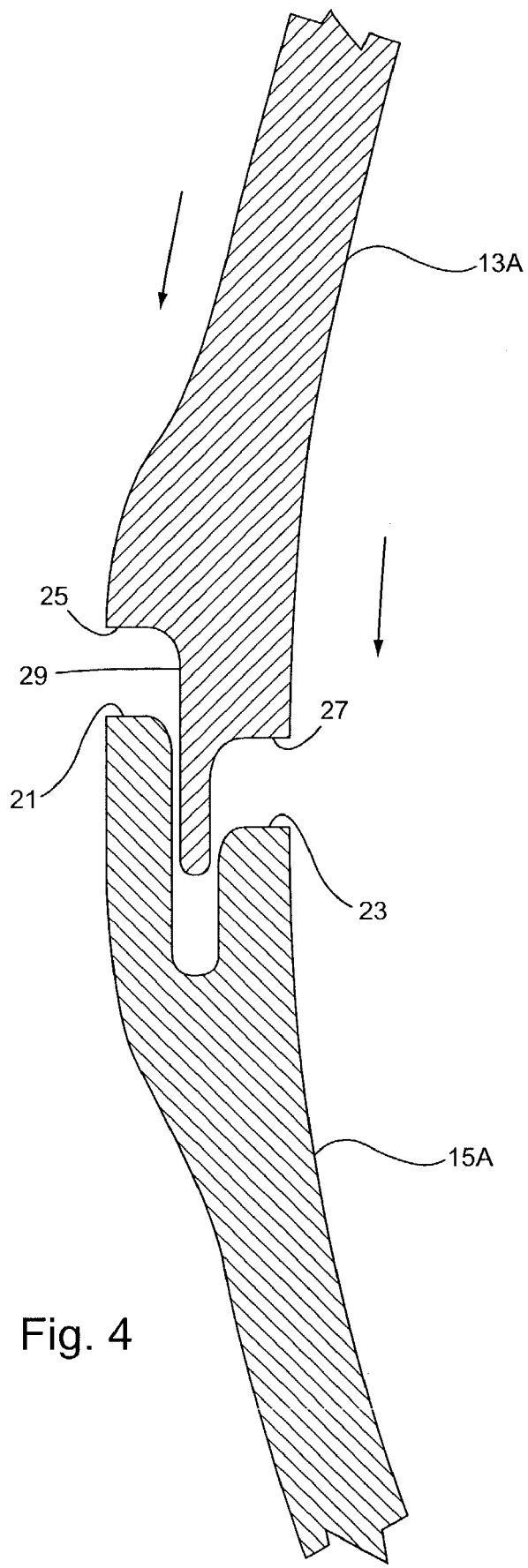
FIG. 4 is a cross-sectional view of one of the joints of the liner, illustrating assembly of the liner.

Also shown in FIG. 3 is a prong or protrusion 29 disposed between mating surfaces 25, 27 and extending from the body 13A of upper panel 13. Prong 29 is sized and shaped to matingly fit between the first and second prongs 21, 23 of the lower panel 15. Of course the other leg of body 13A includes a second such prong 29. Upper panel prongs 29 facilitate the assembly of liner 11 from panels 13, 15 by guiding the upper panel 13 into place above lower panel 15 as indicated in FIG. 4. The prongs also serve to strengthen the joint between the panels. It is preferred, although not required by the present invention, that upper and lower panels 13, 15 be secured to each other by a suitable adhesive such as a water resistant epoxy or polyurethane.

It is preferred, although not required by the broadest form of the present invention, that the upper and lower panels 13, 15 have matching profiles where the panels join so that the interior and exterior surfaces of the passage liner 11 where the panels join are relatively smooth. This feature is illustrated in FIG. 3.

Figure 5:
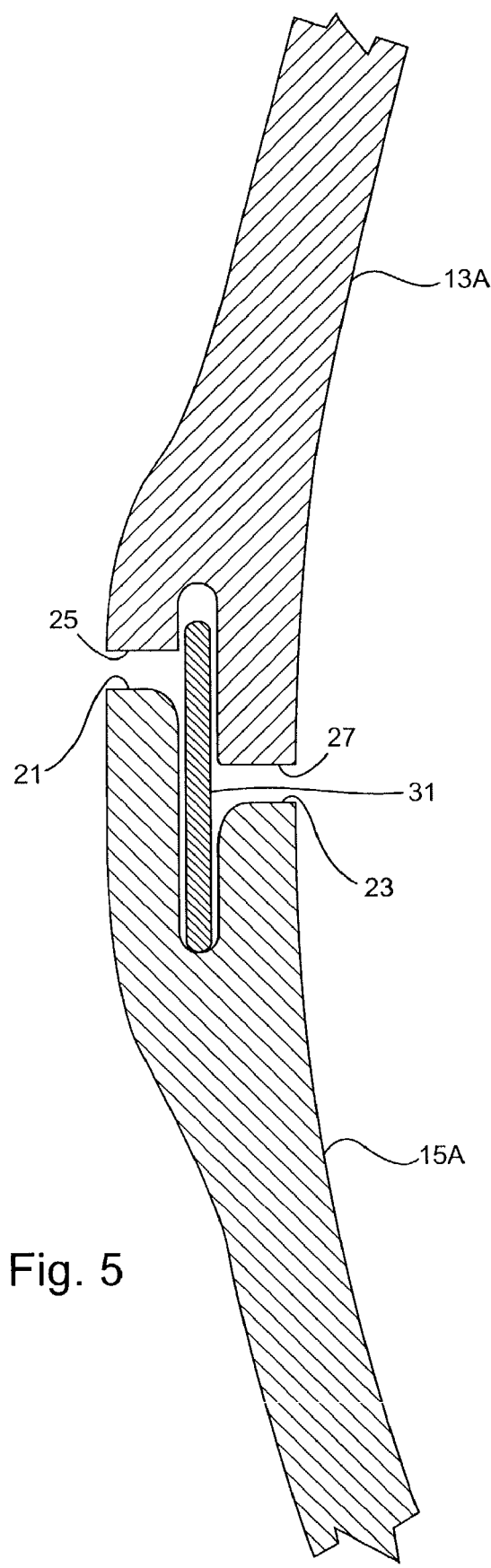
FIG. 5 is an elevation of an alternative construction of the liner joint used in the present invention.

As an alternative to the construction shown in FIGS. 1, 3, and 4, protrusion 29 of the upper panel 13 may be replaced by a third part, a spline 31 (see FIG. 5). Spline 31, like the prongs and mating surfaces, extends substantially the length of the panels. In this particular construction upper panel 13 has (on each side) two prongs projecting from the body of the panel. The ends of those prongs form the first and second mating surfaces 25, 27. Although not a part of the present invention, it is preferred that spline 31 be secured in place (upon assembly of the panels) with a suitable adhesive to form a substantially fixed joint between the upper and lower panels.

Figure 7:
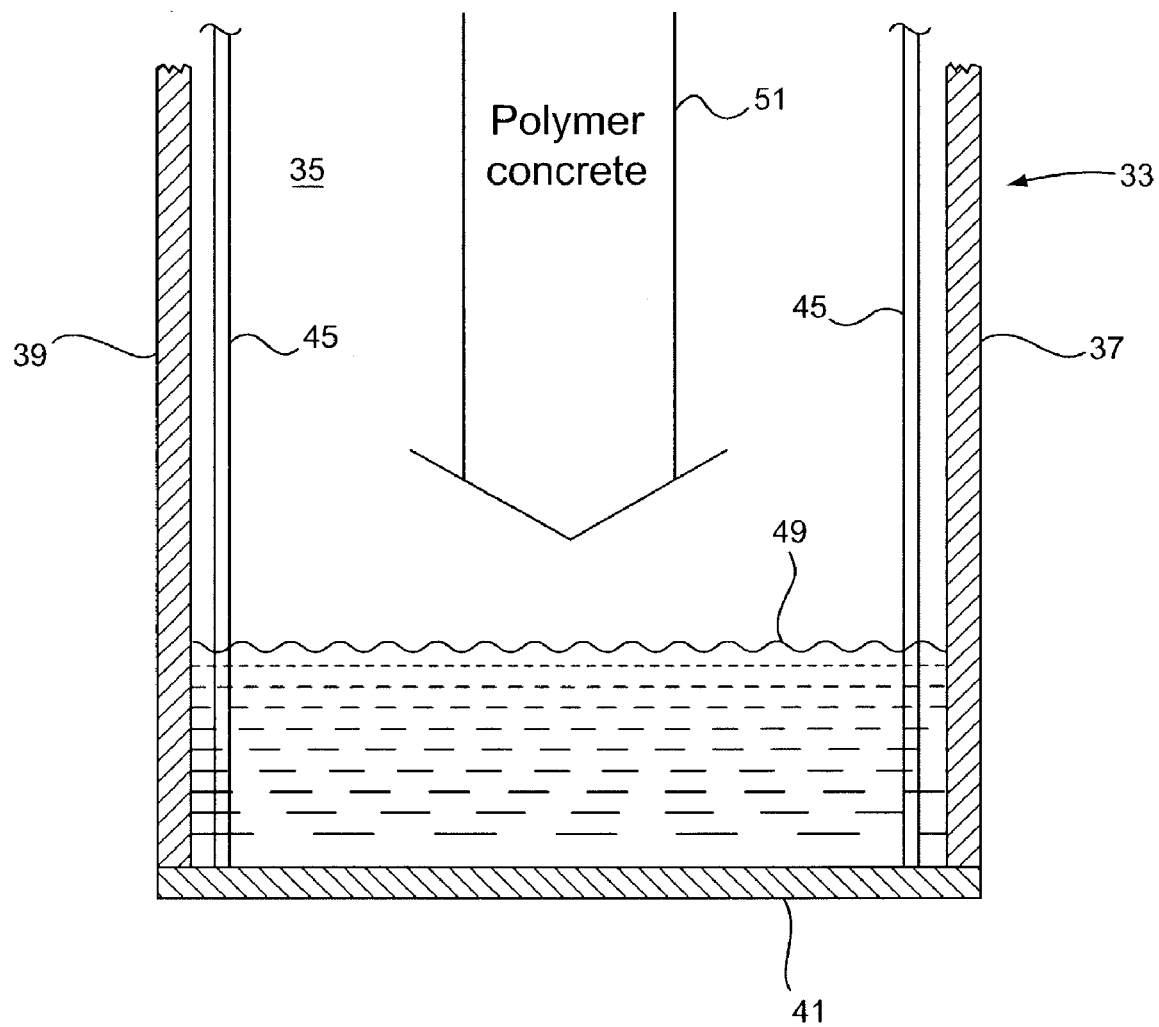
FIG. 7 is a schematic illustrating part of the method of the present invention.

Before the proper sized and shaped panels 13, 15 can be selected to line a passage, it is first necessary to obtain the dimensions of the passage to be lined. Panels 13, 15 appropriate for that passage are then selected. At some point, whether before or after the passage dimensions are obtained, the required panels are molded in a mold 33 having a mold cavity (or cavities) 35 (see FIG. 7 for an illustrative mold 33 and mold cavity 35). The particular form and type of the mold and mold cavity do not form part of the present invention. The mold cavity shape and size are selected to form a molded panel corresponding to the desired shape and size of panel to be inserted in a passage to be lined. Upper and lower panels require different molds, and differently shaped panels would require different molds as well. Mold 33 shown is a generic mold chosen to illustrate the features of the present invention. It is preferred, but not required, that the mold cavity be open to the atmosphere.

Mold 33 has inner and outer walls 37, 39 defining the inner and outer walls of the panel being molded. Mold 33 has a base 41 that may either be a permanent part of the mold or that may be formed in place by a suitable inexpensive material. The mold may be made of any suitable material such as resin impregnated fiberglass, steel, or any other known mold material. The particular mold material does not constitute any part of the present invention.

Figure 6:
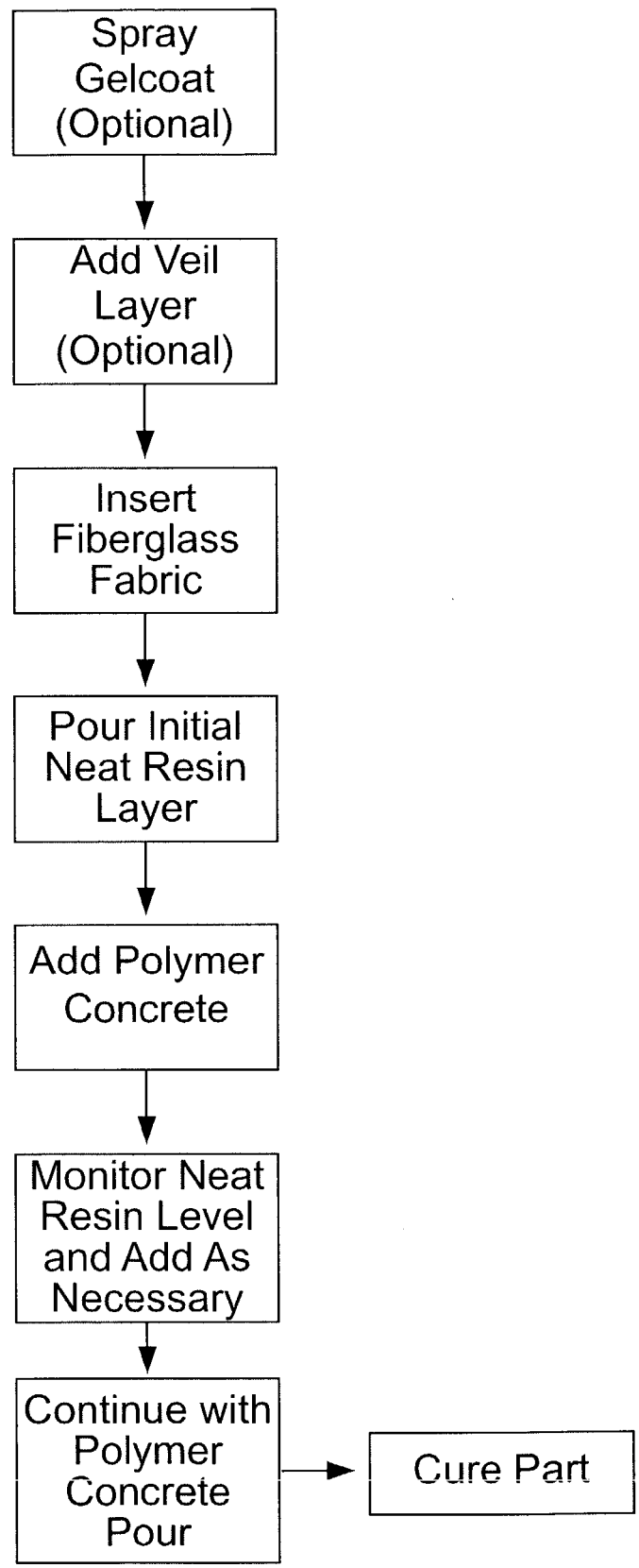
FIG. 6 is a flow chart illustrating the method of the present invention.

The molding process itself is outlined in FIG. 6. If desired, the mold cavity may first be sprayed with a thermosetting resin gel-coat layer, thereby forming the first layer of the molded panel, although the gel-coat layer does not form any part of the present invention. Then an optional veil layer of fine fiberglass material is inserted into the mold. The veil layer, if desired, provides additional environmental resistance.

The term "neat resin" (as used in the various components of the molded part as described below) is preferably a thermosetting resin, such as a polyester resin, a vinyl ester resin, or a DCPD (dicyclopentadiene) resin, or a blend of any two of the foregoing resins. Alternatively, the neat resin could be a polyurethane resin. The following resins are examples of such resins suitable for use in the present invention:

| Resin Type | Composition |
| --- | --- |
| Polyester | isophthalic propylene glycol, styrene monomer |
| Vinyl Ester | bisphenol A, styrene monomer |
| DCPD | dicyclopentadiene, styrene monomer |
| Polyurethane | polyisocyanates & polyols |

Moreover, the "neat resin" as that term is used throughout this specification and the claims, may have a feldspar filler of up to 23% by weight of the resin. It is preferred that the feldspar filler be of grade Minspar 4. Thus, it can be seen that neat resin, as used herein, refers to a lightly filled or non-filled resin. As will appear, it is also required that the neat resin have a density less than that of the flowable, curable polymer concrete described below.

After the gel-coat and veil layer (if any) are inserted into the mold cavity 35, a layer of woven bi-directional fiber 45 is inserted along the periphery of the cavity. (Although the present invention is described in terms of fiberglass, it should be understood that other fibers such as carbon fibers and aramid fibers may be used instead and fall within the scope of the present invention.) It is preferred that the fiberglass layer substantially cover at least what will become the interior and exterior surfaces of the resulting molded panel. The fiberglass is preferably a biaxial woven fiberglass fabric with a minimum weight of approximately 26 ounces per square yard per layer. It should be understood that the particular weight of the fabric does not form a part of the present invention. It is also preferred, but not required, that a majority of the strands of the fiberglass fabric run in the hoop direction around the pipe liner. Fiberglass layer 45 has openings therein so as to allow the passage of at least some neat resin, as described below, from the interior of the mold space to the periphery of the mold cavity.

After the fiberglass layer is inserted in the mold cavity, an initial pour of neat resin is introduced into the mold cavity. That initial pour is indicated by the liquid 49 disposed in the bottom of mold 33. By way of example and not by way of limitation, the initial pour of neat resin could form a four inch thick layer of resin in the bottom of the mold. After the initial pour of neat resin, a flowable, curable polymer concrete (indicated by arrow 51) is introduced into the mold cavity. The polymer concrete is preferably composed of neat resin with, by way of example, 70% by weight sand or glass filler. The sand is preferably grade 60 silica sand. References to "pour" in this specification are used in the general sense of "to cause to flow in a stream", "to dispense from a container", "to supply or produce freely or copiously", "to move continuously", "the action of pouring", or "an instance of pouring or an amount poured." Nothing in the specification should be read to indicate that the pouring must occur from the top by action of gravity, since pouring in this general sense also includes introducing or inserting materials from the bottom or sides (or the top) by a pumping action or the like.

The polymer concrete has a density and a viscosity substantially greater than the density and viscosity of the neat resin. For example, typical values of density and viscosity are as follows:

| Material | Density | Viscosity |
| --- | --- | --- |
| Neat Resin | 1.05–1.36 g/cc | 250–1100 cps |
| Polymer Concrete | 1.70–2.00 g/cc | 100,000–1,000,000 cps |

Because of these differences in the physical properties of the neat resin and the polymer concrete, the neat resin 49 floats above the polymer concrete 51 and impregnates fiberglass layer 45 as polymer concrete 51 is introduced into the mold cavity. The polymer concrete, on the other hand, being of higher viscosity is unable to substantially penetrate the fiberglass layer, so that the fiberglass layer becomes permeated almost exclusively with neat resin. Of course, neat resin and polymer concrete having densities and viscosities outside the above ranges could be used as well, so long as the density of the polymer concrete substantially exceeds the density of the neat resin being used.

It is preferred, but not required, that the neat resin level in the mold be monitored as the polymer concrete is poured, so that the neat resin can be replenished as needed. In this case, the neat resin layer may, if desired, be maintained at a predetermined thickness such as 3–4". The neat resin and the polymer concrete are then cured to form a panel of the desired shape.

It is preferred, but not required, that the polymer concrete (upon completion of the pour) basically fill the part from bottom to top. Of course, excess neat resin may remain atop the polymer concrete after the pour is completed. Such resin, if necessary, may be removed before curing or, alternatively, cured in place and trimmed off after curing.

In view of the above, it will be seen that all the objects and features of the present invention are achieved, and other advantageous results obtained. The description of the invention contained herein is illustrative only, and is not intended in a limiting sense.

What is claimed is:

1. A method of making a panel for a passage liner, said method comprising the steps of:
   obtaining dimensions of a passage to be lined;
   selecting a panel having a shape suitable for use in the passage to be lined; and
   molding said panel in a mold cavity, said mold cavity having a periphery, said molding step including the steps of:
      disposing a fiber layer around at least a portion of the periphery;
      introducing a layer of neat resin in the mold cavity; and
      subsequently introducing a polymer concrete in the mold cavity such that the neat resin floats above the polymer concrete and impregnates said fiber layer as said polymer concrete is introduced.

2. The method as set forth in claim 1 further including the step of introducing additional neat resin into the mold cavity after at least some of the polymer concrete has been introduced to maintain the layer of neat resin floating atop the polymer concrete.

3. The method as set forth in claim 1 wherein the mold cavity is closed to the atmosphere.

4. The method as set forth in claim 1 wherein the mold cavity is open to the atmosphere.

5. The method as set forth in claim 1 wherein the neat resin and the polymer concrete have substantially different viscosities.

6. A method of making a panel for a passage liner, said method comprising the steps of:
   providing a mold having a mold cavity selected to form a shape corresponding to a desired shape of a panel to be inserted in a passage to be lined;
   disposing a fiber layer around at least a portion of the periphery of the mold cavity, said fiber layer having openings therein so as to allow the passage of at least some fluids from the interior of the mold space to the periphery of the mold cavity;
   inserting neat resin of a predetermined density into the mold cavity, said maid cavity having a top and a bottom so that said neat resin becomes disposed in the bottom of the mold cavity;
   inserting a flowable, curable polymer concrete into the mold cavity after the neat resin is inserted, said polymer concrete having a density greater than the density of the neat resin so that the polymer concrete displaces neat resin from the bottom of the mold cavity toward the top of the mold cavity;
   said neat resin flowing through the openings in the fiber layer to impregnate said fiber layer as said neat resin is displaced toward the top of the mold cavity;
   curing the neat resin and the polymer concrete to form a panel of the desired shape.

7. The method as set forth in claim 6 further including the step of introducing additional neat resin into the mold cavity after at least same of the polymer concrete has been introduced to maintain the layer of neat resin floating atop the polymer concrete.

8. The method as set forth in claim 6 wherein the mold cavity is closed to the atmosphere.

9. The method as set forth in claim 6 wherein the mold cavity is open to the atmosphere.

10. The method as set forth in claim 6 wherein the neat resin and the polymer concrete have substantially different viscosities.

* * * * *

UNITED STATES PATENT AND TRADEMARK OFFICE
CERTIFICATE OF CORRECTION

PATENT NO. : 7,018,577 B2
APPLICATION NO. : 10/364096
DATED : March 28, 2006
INVENTOR(S) : Bilgram et al.

It is certified that error appears in the above-identified patent and that said Letters Patent is hereby corrected as shown below:

Column 7,
Line 19, reads "said maid cavity" should read -- said mold cavity --.

Column 8,
Line 12, "after at least same" should read -- after at least some --.

Signed and Sealed this

Twenty-seventh Day of June, 2006

JON W. DUDAS
*Director of the United States Patent and Trademark Office*